Jan. 31, 1956  R. E. SEELY  2,733,394
DUAL VOLTAGE MOTOR PROTECTOR CIRCUIT
Filed March 31, 1954
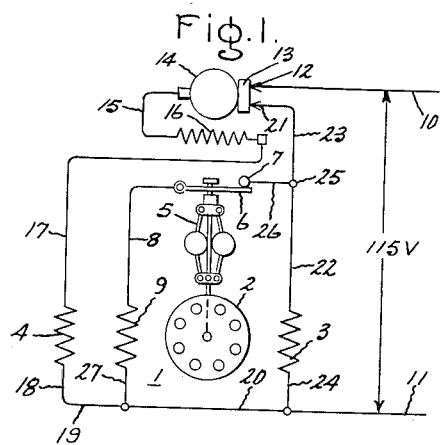
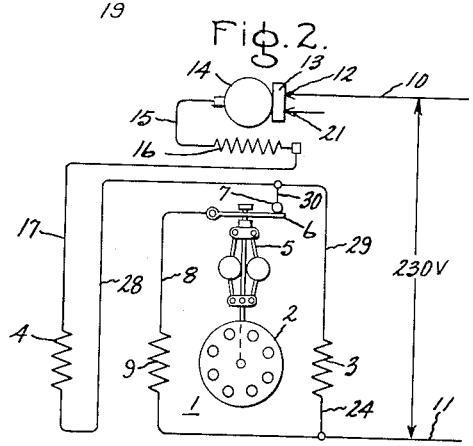
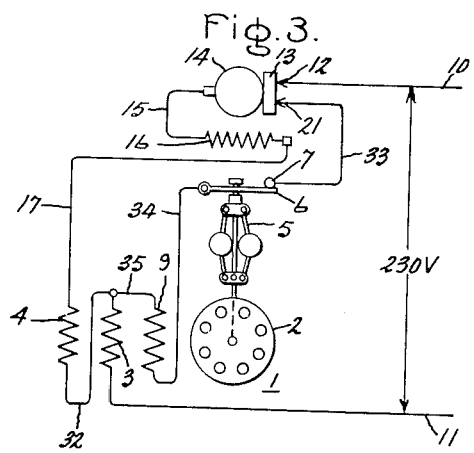
Inventor:
Richard E. Seely,
by Robert G. Irish
His Attorney.

United States Patent Office 2,733,394
Patented Jan. 31, 1956

2,733,394
DUAL VOLTAGE MOTOR PROTECTOR CIRCUIT
Richard E. Seely, Fort Wayne, Ind., assignor to General Electric Company, a corporation of New York
Application March 31, 1954, Serial No. 420,045
9 Claims. (Cl. 318—221)

This invention relates to dynamoelectric machines, and more particularly to protector circuits for dual voltage electric motors.

There are many applications for electric motors which will operate at two different line voltages. It is common practice to provide protection for the windings of such motors so that the line connection to the windings will be broken when the windings reach a certain temperature. The usual method of providing such protection is to connect a bimetallic element and a heating coil in series with the motor windings. The bimetallic element and the heater coil are generally in series with each other, with the coil being physically adjacent the element so that heat therefrom will be transferred to the element. It is clear that operation of a motor at two different voltages will cause two different amounts of currents to pass through the motor circuit. For instance, if one of the operating voltages is double the other, the current at the lower voltage will be about twice that at the higher voltage. Since it is the current that causes heating of the windings, and requires the provision of protection means, it will be seen that the placing of a bimetallic element in series with the motor windings will result in greatly different amounts of current passing through the protector at the different voltages.

For reasons of economy and consistency it is highly desirable that the motor circuit be opened at a specific temperature of the windings, whatever the line voltage impressed upon the motor circuit. In order to achieve this goal, heretofore, it has been necessary to use a bimetallic element having very low resistance since otherwise the difference in current flow through the element itself would cause it to heat up to different temperatures for the same winding temperatures, depending upon the voltage used, and the circuit would be broken at different winding temperatures for the two voltages. Hitherto, it has been necessary that most of the heat required to cause the bimetallic element to open the circuit should come from the heating coil in order to minimize such a result. Under such circumstances it frequently has been found that heater coils in many protective devices are such that they will be caused to melt when carrying the stalled rotor current of a motor.

Thus, it will be seen that, previously, where bimetallic elements were used to protect dual voltage motors the windings would heat up to different temperatures at the different voltages before the circuit opened if high or medium resistance elements were used; conversely, where low resistance elements were used the heating coil would be subject to failure. It is clear that if a high resistance bimetallic element could effectively be used in a dual voltage motor, more heat could be generated in the element itself so that less heat would need be generated in the heater coil. As such larger low resistance heater coils could be used which would not be caused to melt when carrying the stalled current of a motor.

It is, therefore, an object of this invention to provide a dual voltage motor protector circuit which will incorporate the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in one embodiment thereof, provides electrically conductive disconnecting means arranged to open the circuit to the windings of a motor adapted to operate at two different voltages. The means are in series with both windings when the motor is operated at the higher voltage; at the lower voltage, the means are in series with one of the motor windings and in parallel with the other.

In the drawing, Figure 1 is a schematic diagram of a dual voltage electric motor incorporating the improved protector circuit of this invention, the motor being connected to operate at the lower voltage;

Figure 2 is a schematic diagram of the same electric motor when connected to operate at the higher voltage; and Figure 3 is a schematic diagram of the motor showing a modified circuit for operation at the higher voltage.

Referring now to Figure 1 of the drawing, there is shown an induction motor, generally indicated at 1, having a rotor member 2 and a pair of running windings 3 and 4. Rotor member 2 drives a centrifugal mechanism 5 which causes a contact arm 6 to separate from a stationary contact 7 at a predetermined speed. Contact arm 6 is connected by line 8 to a motor starting winding 9, which is physically displaced from windings 3 and 4, so that winding 9 is deenergized when rotor member 2 reaches the predetermined speed. Motor 1 is connected to a source of alternating current power, such as a 115 volt, 60 cycle source, by lines 10 and 11. Line 10 leads into a stationary contact member 12 which is normally in electrical engagement with a bridging contact 13. Contact 13 is secured to and movable with a bimetallic element such as disc 14, which is serially connected by line 15 to a heating coil 16, preferably located in physical proximity to the disc. Disc 14 is arranged so that it will deflect at a predetermined temperature and thereby stop energization of the windings. A line 17 connects the disc 14 and heater 16 to the running winding 4. The circuit through winding 4 is then completed through lines 18, 19, 20 and 11.

Bridging contact 13 connects contact 12 to a contact 21; running winding 3 is connected to contact 21 by lines 22 and 23. Line 24 connects the winding 3 to line 11. It will thus be seen that the circuit through winding 3 is as follows: starting at line 10, through contacts 12, 13 and 21, line 23, line 22, winding 3, and line 24, to line 11. The circuit through winding 4 is as follows: starting at line 10, through contacts 12 and 13, disc 14, line 15, coil 16, line 17, to winding 4, and through lines 18, 19 and 20 to line 11. It will be observed that windings 3 and 4 are thus connected in parallel for low voltage operation, and that disc 14 and coil 16 are in parallel with winding 3 and in series with winding 4. In the embodiment shown, a starting winding 9 is connected in parallel with the other windings 3 and 4. This is achieved by branching off from the circuit through winding 3 at point 25, through a line 26, contact arm 6 and line 8 to winding 9, which is in turn connected to line 11 by means of line 27 and line 20. It will now be seen that since the disc 14 and coil 16 are in parallel with one of the running windings 3 and in series with the other running winding 4, they will receive only approximately half the available current when motor 1 reaches running speed.

It will be understood that the location of the start winding 9 is not critical and may be changed to be in series with disc 14 and coil 16 instead of in parallel as shown. Furthermore, motor 1 and speed responsive means 5 have been explained for illustrative purposes, and it will be apparent that other types of electric motors and other types of starting means may be used with equal success.

Figure 2 is a schematic illustration of the same motor as in Figure 1, and like numerals will be used for like parts. While the means for achieving the different circuit arrangements will not be shown or described, it will be understood that such changes may be effected by means of a standard terminal board, as is well known in the art. With the circuit shown in Figure 2, motor 1 having armature 2 is connected to an alternating current power supply, for instance, one of 230 volts (as opposed to 115 volts in Figure 1), by means of lines 10 and 11. Line 10 leads to contact 12 which is connected to bridging contact 13 as before. The circuit then goes through disc 14, line 15, coil 16, and line 17 to winding 4. In the 230 volts connection shown, winding 4 is connected in series with winding 3 by means of lines 28 and 29, as opposed to the parallel connection of windings 3 and 4 shown in Figure 1. Winding 3 is connected by line 24 to line 11, as before, to complete the circuit. Start winding 9 is located in parallel with winding 3 by means of line 30, contact 7, contact arm 6, line 8 and line 31. It will be seen that while start winding 9 is in parallel with winding 3 it is in series with winding 4. At the predetermined speed centrifugal mechanism 5 will pull down contact arm 6 as before to disconnect winding 9, so that motor 1 will run on windings 3 and 4 alone.

It will be observed that in the circuit shown in Figure 2, contact 21 is disconnected and no longer forms a part of the circuit. As a result of this, the entire current will flow through disc 14 and coil 16. Since the voltage supply is double that shown in Figure 1 the current will be approximately half. However, since only half of the running current flows through disc 14 and coil 16 in the circuit of Figure 1, the disc and coil will be subject to the same current without regard to the voltage supply. As a result, since the heating of the bimetallic disc 14 is a function of the current passing through it and through coil 16, it will open at the same winding temperature whether the supply voltage be 115 or 230 volts.

Referring now to Figure 3, there is shown a modification of the 230 volt circuit of Figure 2; like numerals will be used for like parts. Power is supplied through line 10 to contact 12 which is normally in engagement with bridging contact 13. The circuit then continues through disc 14, line 15, and coil 16 to line 17 and winding 4. The current then passes through line 32 to winding 3 and out through line 11. It will thus be seen that, as in Figure 2, running windings 4 and 3 are serially connected with each other and with the disc 14 and coil 16. The circuit through start winding 9 goes from bridging contact 13 through contact 21, line 33, contact 7, contact arm 6, and line 34 to start winding 9. The start winding is joined in parallel with winding 4 and in series with winding 3 by line 35. In this embodiment, the bimetallic disc never receives the current from winding 9, even before it is disconnected by centrifugal mechanism 5, since the circuit to the start winding 9 does not go through the disc 14 or the coil 16. Because of this, disc 14 will not break the circuit so quickly when a locked condition of rotor 2 occurs. In Figure 2, where the current for the start winding must also pass through disc 14, a locked rotor situation will cause the disc to open the circuit somewhat quicker than in the embodiment of Figure 3; depending upon the application of the motor 1, either one of the two embodiments may prove to be the more desirable.

Another variation of Figure 3 is to connect lead 33 to lead 15 instead of to the stationary contact 21. In this manner the start current flows thru the disc 14 but not through the heater coil 16. As such, this variation is between that shown in Figure 2 and Figure 3.

It will be seen that this invention provides an arrangement whereby a bimetallic protector element for a dual voltage motor is subjected to the same current at both operating voltages, and therefore will open the circuit at the same winding temperature, whichever voltage supply is used. Since this is true, the resistance of disc 14 may be varied as desired; in particular, it may be made high enough so that it will heat up of its own accord when the windings heat up, and coil 16 will not have to furnish the entire amount of heat to cause disc 14 to break the circuit. As a result, coil 16 is not under such a load and is not so likely to fuse and necessitate replacement.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. In combination with a dual voltage motor having a pair of running windings, said windings being connected in parallel when said motor is operated on one voltage and being connected in series when said motor is operated on a second voltage; means for protecting said windings from excessive heating comprising electrically conductive heat sensitive means operable at a predetermined temperature, contact means in series with said windings and arranged to be controlled by operation of said sensitive means to break the energizing circuits to said windings at said predetermined temperature, said sensitive means being connected in series with one of said windings, and electrical connections arranged so that said sensitive means is connected in parallel with the other of said windings when said motor is operated on said one voltage and is connected in series with the other of said windings when said motor is operated on said second voltage.

2. In combination with a dual voltage motor having a start winding and a pair of running windings, said start winding being connected in parallel with one of said running windings, said running windings being connected in parallel when said motor is operated on one voltage and being connected in series when said motor is operated on a second voltage; means for protecting said windings from excessive heating comprising electrically conductive heat sensitive means operable at a predetermined temperature, contact means in series with said windings and arranged to be controlled by operation of said sensitive means to break the energizing circuit to said windings at said predetermined temperature, said sensitive means being connected in series with the other of said running windings and in parallel with said start winding, and electrical connections arranged so that said sensitive means is connected in parallel with the said one of said running windings when said motor is operated on said one voltage and is connected in series with the said one of said windings when said motor is operated on said second voltage.

3. In combination with a dual voltage motor having a start winding and a pair of running windings, said running windings being connected in parallel when said motor is operated on one voltage and being connected in series when said motor is operated on a second voltage; means for protecting said windings from excessive heating comprising electrically conductive heat sensitive means operable at a predetermined temperature, contact means in series with said windings and arranged to be controlled by operation of said sensitive means to break the energizing circuit to said windings at said predetermined temperature, said sensitive means being connected in series with one of said running windings, and electrical connections arranged so that said sensitive means is connected in parallel with the other of said windings when said motor is operated on said one voltage and is connected in series with the other of said windings when said motor is operated on said second voltage, said start winding being connected in parallel with said sensitive means when said motor is operated on said one voltage and being connected in series with said sensitive means when said motor is operated on said second voltage.

4. In combination with a dual voltage motor having a start winding and a pair of running windings, said start winding being connected in parallel with one of said running windings when said motor is operated at one voltage and being in series therewith when said motor is operated at a second voltage, said running windings being connected in parallel when said motor is operated on said one voltage and being connected in series when said motor is operated on said second voltage; means for protecting said windings from excessive heating comprising electrically conductive heat sensitive means operable at a predetermined temperature, said sensitive means being connected in series with the other of said running windings, contact means in series with said windings and arranged to be controlled by operation of said sensitive means to break the energizing circuit to said windings of said predetermined temperature, and electrical connections arranged so that said sensitive means is connected in parallel with the said one of said running windings when said motor is operated on said one voltage and is connected in series with the said one of said windings when said motor is operated on said second voltage.

5. In combination with a dual voltage motor having a pair of running windings, said windings being connected in parallel when said motor is operated on one voltage and being connected in series when said motor is operated on a second voltage; means for protecting said windings from excessive heating comprising a bimetallic element arranged to break the energizing circuits to said windings at a predetermined temperature, said bimetallic element being connected in series with one of said windings, and electrical connections arranged so that said bimetallic element is connected in parallel with the other of said windings when said motor is operated on said one voltage and is connected in series with the other of said windings when said motor is operated on said second voltage.

6. In combination with a dual voltage motor having a pair of running windings, said windings being connected in parallel when said motor is operated on one voltage and being connected in series when said motor is operated on a second voltage; means for protecting said running windings from excessive heating comprising a bimetallic element and a heating element connected in series therewith and in physical proximity thereto whereby said bimetallic element will deflect at a predetermined temperature to stop the energization of said windings, said elements being connected in series with one of said windings, and electrical connections arranged so that said elements are connected in parallel with the other of said windings when said motor is operated on said one voltage and are connected in series with said other of said windings when said motor is operated on said second voltage.

7. In combination with a dual voltage motor having a pair of running windings, said windings being connected in parallel when said motor is operated on one voltage and being connected in series when said motor is operated on a second voltage; means for protecting said running windings from excessive heating comprising a bimetallic element and a heating element connected in series therewith and in physical proximity thereto whereby said bimetallic element will deflect at a predetermined temperature to stop the energization of said windings, said elements being connected in series with one of said windings, electrical connections arranged so that said elements are connected in parallel with the other of said windings when said motor is operated on said one voltage and are connected in series with said other of said windings when said motor is operated on said second voltage, said electrical connections comprising a bridging contact member mechanically secured to said bimetallic element and electrically positioned in series between said bimetallic element and a supply source, said other winding being connected to said supply source through said contact member when said motor is operated at said one voltage whereby deflection of said bimetallic element will cause movement of said bridging contact member to stop the energization of the windings when said motor is operated on either of the two said voltages.

8. In combination with a dual voltage motor having a start winding and a pair of running windings, said start winding being connected in parallel with one of said running windings, said running windings being connected in parallel when said motor is operated on one voltage and being connected in series when said motor is operated on a second voltage; means for protecting said running windings from excessive heating comprising a bimetallic element and a heating element connected in series therewith and in physical proximity thereto whereby said bimetallic element will deflect at a predetermined temperature to stop the energization of said windings, said elements being connected in series with the other of said running windings and in parallel with said start winding, electrical connections arranged so that said elements are connected in parallel with the said one of said running windings when said motor is operated on said one voltage and are connected in series with the said one of said windings when said motor is operated on said second voltage, said electrical connections comprising a bridging contact member mechanically secured to said bimetallic element and electrically connected in series between said bimetallic element and a supply source, said one of said running windings being connected to said supply source through said contact member when said motor is operated at said one voltage whereby deflection of said bimetallic element will cause movement of said bridging contact member to stop the energization of the running windings when said motor is operated on either of the two said voltages.

9. In combination with a dual voltage motor having a start winding and a pair of running windings, said start winding being connected in parallel with one of said running windings when said motor is operated on one voltage and being in series therewith when said motor is operated on a second voltage, said running windings being connected in parallel when said motor is operated on one voltage and being connected in series when said motor is operated on a second voltage; means for protecting said running windings from excessive heating comprising a bimetallic element and a heating element connected in series therewith and in physical proximity thereto whereby said bimetallic element will deflect at a predetermined temperature to stop the energization of said windings, said elements being connected in series with the other of said running windings, electrical connections arranged so that said elements are connected in parallel with the said one of said running windings when said motor is operated on said one voltage and are connected in series with the said one of said windings when said motor is operated on said second voltage, said electrical connections comprising a bridging contact member mechanically secured to said bimetallic element and electrically connected in series between said bimetallic element and a supply source, said one of said running windings being connected to said supply source through said contact member when said motor is operated at said one voltage whereby deflection of said bimetallic element will cause movement of said bridging contact member to stop the energization of the running windings when said motor is operated on either of the two said voltages.

References Cited in the file of this patent

UNITED STATES PATENTS

| 2,319,490 | Clark | May 18, 1943 |
| 2,590,058 | Willits | Mar. 18, 1952 |
| 2,630,553 | Seely | Mar. 3, 1953 |
| 2,632,876 | Willits | Mar. 24, 1953 |